April 1, 1941.                C. B. MOORE                2,237,038
                    FLUID PRESSURE CONTROL APPARATUS
                      Filed April 16, 1937          2 Sheets-Sheet 2

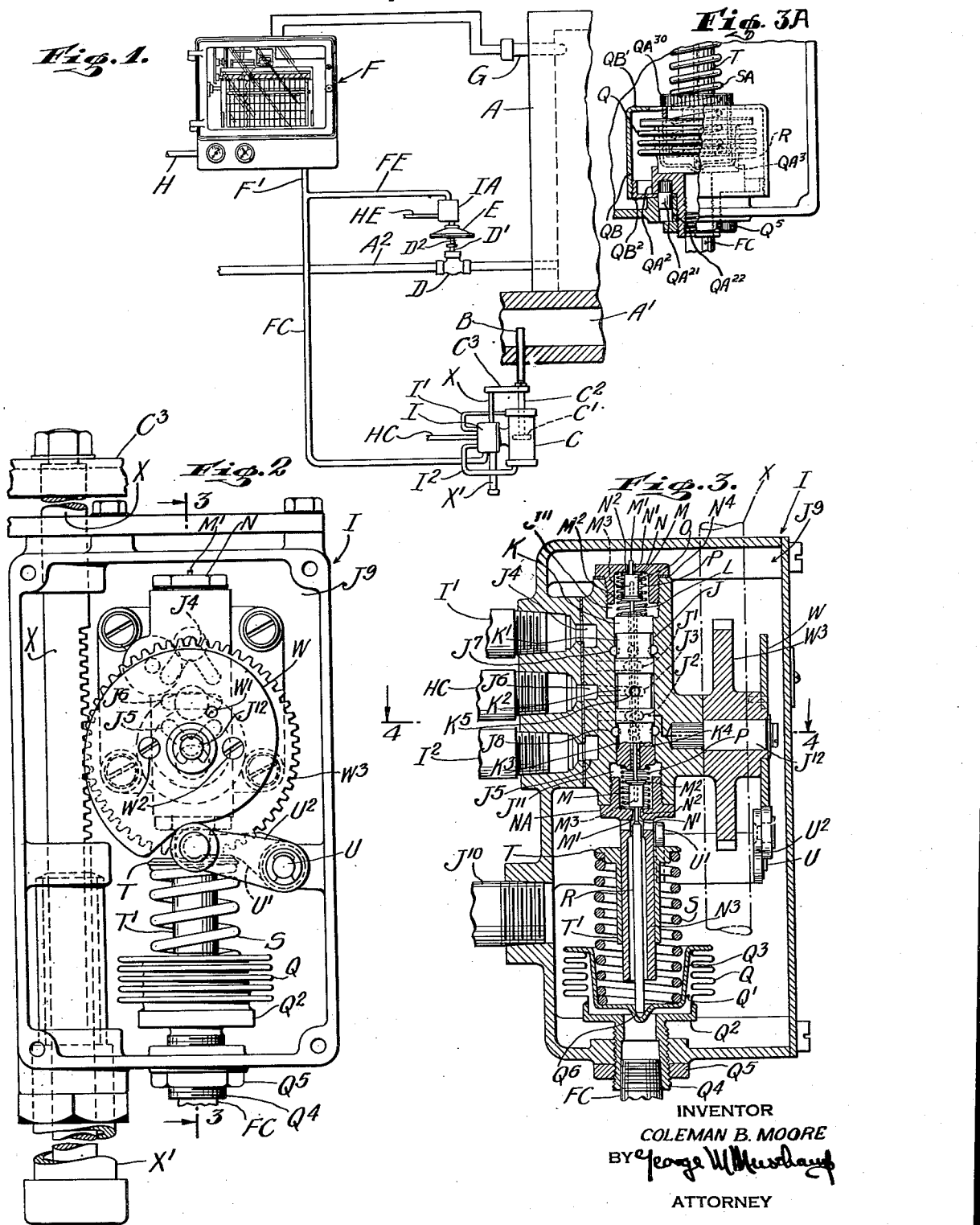

INVENTOR
COLEMAN B. MOORE
BY George M. Marchamf
ATTORNEY

Patented Apr. 1, 1941

2,237,038

UNITED STATES PATENT OFFICE 2,237,038

FLUID PRESSURE CONTROL APPARATUS

Coleman B. Moore, Carroll Park, Pa., assignor to The Brown Instrument Company, Philadelphia, Pa., a corporation of Pennsylvania Application April 16, 1937, Serial No. 137,247

11 Claims. (Cl. 121—41)

The general object of the present invention is to provide improvements in control apparatus of the type in which a fuel valve, damper or other regulator is adjusted into different positions by and in accordance with changes with a variable fluid pressure control force.

So-called air controllers of various types and forms are now in commercial use. An air controller of approved commercial form, is a reliable and effective device for maintaining a controlling air pressure varying in predetermined accordance with variations in a controlling quantity, or conditions which the air controller measures, or is otherwise responsive. An ordinary commercial air controller is a relatively small device, without the air handling capacity required to permit of the direct use of the controlling air pressure in effecting adjustments of furnace fuel valve, damper, and other regulators, requiring relatively substantial amounts of energy to be expended in effecting their adjustments, and it is customary practice to actuate such regulators through a relay mechanism of some sort which is directly controlled by the controlling air pressure.

A specific object of the present invention is to provide an improved fluid pressure relay mechanism, adapted for control by an air controller of any usual or suitable type. A still more specific object of the invention is to provide novel means, characterized by their simplicity and effectiveness, by which any particular change in the magnitude of the controlling air pressure will result in a definite and precisely predetermined extent of movement of the actuating piston or diaphragm or of a fluid pressure relay mechanism.

The present invention comprises means including a cam for effecting movements of the relay actuating piston or damper in precise correspondence with a function of the controlling air pressure which determines the contour of said cam, and can be modified by changing the contour of that cam. In consequence of its capacity for precisely regulating the movements of the actuating piston or deflection to the changes in the control pressure in accordance with any desired law or proportion, the use of the invention makes it possible to accurately control a plurality of related quantities through corresponding regulators by and in accordance with the controlling air pressure maintained by a common air controller, without providing each such regulator with means for measuring the volume of draft, fuel feed or other, controlled by the regulator, and subjecting the latter to a reaction based on such measurement, as has been found practically necessary heretofore in combustion control and analogous control actions, to relatively proportion the supplies of combustion air, fluid fuel, water to be evaporated, etc., as by regulators controlled by a control force created by a common master controller.

The general features of novelty which characterize the present invention are pointed out with particularity in the claims annexed to and forming a part of this specification. For a better understanding of the invention, however, its advantages, and specific objects attained with its use, reference should be had to the accompanying drawings and descriptive matter, in which I have illustrated and described preferred embodiments of the invention.

Of the drawings:

Fig. 1 is a diagrammatic representation of a furnace control system in which fuel and combustion air are supplied at rates controlled, in accordance with the present invention, by an air controller responsive to a furnace temperature;

Fig. 2 is a side elevation of a portion of the combustion air regulator shown in Fig. 1, with parts removed;

Fig. 3 is a section on the line 3—3 of Fig. 2;

Fig. 3A illustrates a modification of a portion of Fig. 3;

Figure 4:
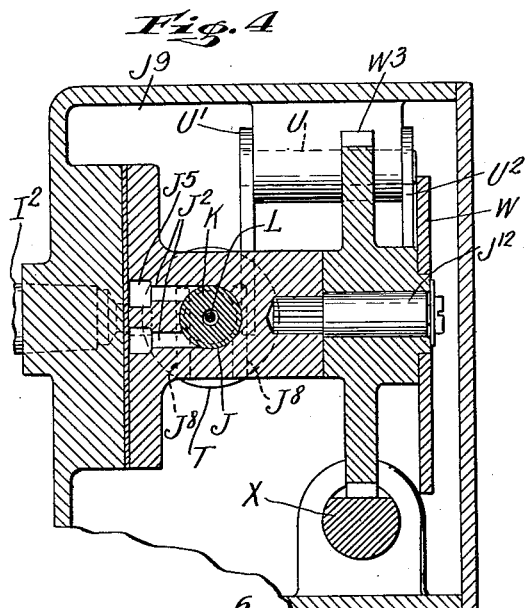
Fig. 4 is a horizontal section on the broken line 4—4 of Fig. 3.

In the furnace control system shown in Fig. 1, A represents a furnace combustion chamber to which combustion air is supplied through a draft duct A', and to which fluid fuel is supplied through a fuel supply pipe $A^2$. The rate of air flow through the duct A' is dependent upon the adjustment of an air regulator comprising a damper B connected to and actuated by the stem $C^2$ of the piston C' working in the cylinder C of a fluid pressure servo-motor or relay device. The rate at which fuel is supplied through the pipe $A^2$, is regulated by a fuel regulator, comprising a fuel valve D, having its stem D' connected to a flexible diaphragm E', forming the movable wall of a pressure chamber E, the valve being biased by a spring $D^2$ for movement of its stem D' in the direction opposite to that in which it is moved on an increase in the pressure in the pressure chamber E. The adjustments of the damper B and valve D are controlled by, and effected in direct response to a controlling air pressure transmitted to the air and fuel regulators, by branches FC and FE of the control pressure piping F" of control instrument F.

The latter is responsive to the furnace chamber temperature to which a thermo-couple G is exposed. The thermo-couple G is connected to, and forms the controlling device for, the instrument F. For the purposes of the present invention, the instrument F may be an air controller of any commercial or other type adapted to maintain an air pressure in the piping F", varying in predetermined accordance with changes in the temperature to which the thermo-couple G is responsive. As shown, the instrument F is of the commercial type and form known as a "Brown potentiometer", and including air control provisions of the type employed in an air controller mechanism known commercially, as the "Air-O-Line controller." Inasmuch as the potentiometric and air control features of the instrument F, are well known and in commercial use, and the present invention, moreover, is not restricted to, or concerned with the specific form of such features, the instrument F need not be illustrated or described in detail herein. It is noted, however, that the instrument F receives air under approximately constant pressure through a pressure supply pipe H, and comprises a bleeder valve mechanism, adjusted in response to changes in the temperature, of the thermo-couple G, by which the pressure of the air supplied by the pipe H is reduced as required for the maintenance of the proper air pressure in the piping F".

The movements of the piston C' in the cylinder C, and thereby the adjustments of the damper B, are directly controlled by a valve mechanism I associated with the cylinder C, and operable to connect either end of the cylinder C to a motor pressure fluid supply pipe HC, and simultaneously connect the other end of the cylinder C to exhaust, and, alternatively, to simultaneously close connection with both ends of the cylinder. The valve mechanism I, comprises a housing structure including cylindrical valve chamber J, the axis of which is parallel to the axis of the cylinder C. Pipes I' and $I^2$ lead from the opposite ends of the cylinder C to the valve chamber J, with which they communicate through ports J' and $J^2$ in the wall of the chamber J. The motor fluid supply pipe HC communicates with the chamber J, through a port $J^3$ in the wall of the latter intermediate the ports J' and $J^2$. The pipes I' and $I^2$ are connected to the ports J' and $J^2$ by passages $J^4$ and $J^5$, respectively, in the wall of the chamber J, each comprising a portion parallel to, and a portion tangential to said chamber, so that the ports J' and $J^2$ may be separated by a distance less than that desirably separating the pipes I' and $I^2$. The pipe HC communicates with the port $J^3$ through a channel $J^6$, including a portion tangential to the chamber J. Above the port J' exhaust ports $J^7$ are formed in the wall of the chamber J, and similar exhaust ports $J^8$ are formed in the wall of the chamber J below the port $J^2$. The ports $J^7$ and $J^8$ might lead from the chamber J directly to the atmosphere, but as shown, they open into a chamber space $J^9$, within the housing structure I and in free communication with the atmosphere through a vent $J^{10}$.

Communication of the ports J' and $J^2$ with the respectively adjacent exhaust ports $J^7$ and $J^8$, and with the common motor fluid supply port $J^3$, is controlled by axial adjustment of a piston valve K working in the chamber J. The valve K is in the form of a hollow cylinder having axially displaced peripheral grooves, K', $K^2$, and $K^3$, and an axial passage, or base $K^4$. The grooves K', $K^2$, and $K^3$, and ports J', $J^2$, $J^3$, $J^7$, and $J^8$ are so relatively disposed, axially of the chamber J, that in the intermediate position of the valve K, shown in Fig. 3, the port J' is closed by the portion of the peripheral wall of the valve K, between the grooves K' and $K^2$, and the port $J^2$ is closed by the peripheral wall portion between the grooves $K^2$ and $K^3$, so that no flow in either direction is then permitted through either of the pipes I' and $I^2$. On movement of the valve K from its intermediate position shown in Fig. 2, into an upper valve position, the groove $K^2$ establishes communication between the ports J' and $J^3$, permitting motor pressure fluid to pass from the pipe HC through the pipe I', into the corresponding end of the cylinder C, while at the same time, the groove $K^3$ establishes communication between the exhaust ports $J^8$ and port $J^2$, so that motive fluid may then flow through the pipe $I^2$ out of the corresponding end of the cylinder C. The movement of the valve K upward from its position shown in Fig. 3 thus effects an opening adjustment of the damper B. Conversely, on downward movement of the valve K from its neutral position shown in Fig. 3, the central groove $K^2$ connects the ports $J^2$ and $J^3$, and the upper groove K' connects the port J' to the exhaust ports $J^7$, and thereby gives the damper B a closing adjustment. Each movement of the piston C' in either direction initiated, as described, continues until the valve K is returned, as hereinafter described, to its position shown in Fig. 3.

The valve K is given its axial movements by variations in the air pressures acting on its opposite ends. Those variations result from the axial adjustment of a pilot valve mechanism which comprises a rod L extending axially through the valve K, and similar pilot valve members M, which are coaxial with, and are engaged by the opposite ends of, the rod L. Each member M is located in a corresponding space $J^{11}$, constituting an extension, or end enlargement, of the valve chamber J. The upper end of the space $J^{11}$ at the upper end of the chamber J, is closed by a plug member N, threaded into the space $J^{11}$, and formed with an axial port N' opening from said space into the space $J^9$. The upper valve member M, comprises a cylindrical body portion with an axial guide extension M' at one end, loosely received in and projecting through the port N'. At its opposite end, the member M is provided with a peripheral flange $M^2$, and with an axial socket $M^3$ receiving the corresponding end of the rod L. A helical spring O acting between the member N and the flange $M^2$ of the adjacent member M, tends to hold the annular end, valve face forming surface of the latter, which surrounds the extension M', away from the flat annular valve seat surface $N^2$ surrounding the inner end of the port N'.

The lower valve member M, as shown, is a counterpart of the upper member M and is associated with a member NA, and the latter includes a body portion exactly like the member N, and a depending tubular extension $N^3$. No spring, corresponding to the spring O, acts between the member NA and the lower member M. The parts are so proportioned that the total axial movement permitted the pilot valve mechanism is very small, and may be of the order of one to two hundredths of an inch. To permit of close adjustment of this distance, the extent to which the member N can be screwed into the upper space $J^{11}$, is fixed by means of a washer shim $N^4$, which may be replaced by a slightly thicker or thinner washer shim, to thereby vary said distance, and the extend of pilot valve movement.

The axial passage or bore $K^4$ of the valve K, receives motive fluid from the pipe HC through one or more radial ports $K^5$ opening at their outer ends into the valve groove $K^2$. The motive fluid thus passing into the bore $K^4$ escapes at the ends of the latter into the end spaces $J^{11}$, but slowly, since the flow must pass along restricted leakage paths. In the preferred construction illustrated, the diameter of the rod L is appreciably smaller than the diameter of the axial passage $K^4$, but bushings seated in the ends of the passage $K^4$ have axial passages, but very little larger in diameter than the portions of the rod L extending through them. As shown, a spring P acts between each end of the valve K and the adjacent member N and NA. The springs P tend to hold the valve K in its intermediate position shown in Fig. 3, but do not prevent, or significantly oppose or restrict, movement of the valve out of said position when the relative pressures in the spaces $J^{11}$ change.

In the condition of the apparatus shown in Fig. 3, each member M is out of engagement with the corresponding valve seat surface $N^2$. The leakage or flow capacity of each port $N'$ is then sufficiently in excess of the flow capacity of the paths of flow into the spaces $J^{11}$ from the passage $K^4$, so that the pressure in each space $J^{11}$ is practically equal to atmospheric pressure. When the pilot valve mechanism is actuated, however, to move one or the other of the members M into engagement with the corresponding valve surface $N^2$, thereby preventing flow out of the corresponding space $J^{11}$, the pressure therein quickly builds up to an equality with the pressure in the pipe HC. The valve K then moves away from the space $J^{11}$ in which the pressure has increased, toward engagement with the valve member M in the other space $J^{11}$. The latter on such engagement would be moved toward the adjacent valve seat $N^2$, with the result of thus equalizing the pressures in the two chambers $J^{11}$ if the axial movements of the pilot valve mechanism were not subject to the control of mechanism now to be described.

The control pressure pipe FC communicates with a space $Q'$ enclosed by a wall including an expansible bellows Q, within the chamber $J^9$. The ends of the bellows Q are connected to the end wall members $Q^2$ and $Q^3$. The end member $Q^2$ has a nipple $Q^4$ threaded through the lower end wall of the chamber $J^9$ and adjustably secured to said end wall by a locking nut $Q^5$. The pipe FC communicates with the space $Q'$ through the nipple $Q^4$. The end member $Q^3$ moves as the bellows expands and contracts. The bellows unit is coaxial with the valve chamber J, and the movable end wall $Q^3$ is formed with a central depression $Q^6$, providing a seat for the lower end of a thrust rod R, acting between the end wall $Q^3$ and the axial extension $M'$ of the lower pilot valve member M. The thrust rod R passes axially through the sleeve part $N^3$, which is shaped to loosely receive, and prevent significant transverse movement of, the upper end of the rod R. The control pressure transmitted to the valve mechanism I by the pipe FC, thus tends, regardless of its actual value, to move the pilot valve mechanism into its upper position, and, but for means now to be described, would hold the pilot valve mechanism in the position for movement of the damper B in the closing direction.

The control pressure force acting upwardly from the movable bellows end wall $Q^3$ is normally balanced by the opposing action of a helical spring S. The latter acts between the end wall $Q^3$ and a tubular spring abutment member T, having a sleeve or elongated hub portion $T'$ surrounding the sleeve $N^3$, and axially movable relative to the latter. The spring abutment T is mechanically connected to the piston $C'$, so that each axial movement of the latter results in a corresponding axial adjustment of the abutment member T. The operating connection between the piston $C'$ and spring abutment member T, comprises a rock shaft U pivoted in the chamber $J^9$, and having one arm $U'$ engaging the upper end of the abutment T and having another arm $U^2$ engaged by the edge of a cam disk W, detachably secured by a pin $W'$ and screws $W^2$, to a spur gear $W^3$. The latter is journalled on a stationary shaft $J^{12}$ and has its teeth in mesh with the teeth of a rack bar X extending through the chamber $J^9$ and parallel to the axis of the valve chamber J. At its upper end, the rack bar X is secured to an arm $C^3$ extending transversely of, and rigidly secured to the stem $C^2$ of the piston $C'$. As shown, the lower end of the rack bar X is telescopically received in a guide tube $X'$ extending through and received in the lower end wall of the chamber $J^9$.

In operation, as will be apparent, a change in the control pressure transmitted to the bellows space $Q'$, will tend to contract or elongate the bellows Q. Assume, for example, that the temperature to which the thermo-couple G is exposed rises above its normal or desired value. The instrument F will then increase the control pressure which is transmitted through the pipe FC to the interior of the bellows Q, and elongates the latter, sufficiently to give the pilot valve mechanism an upward movement, causing the upper valve member M to engage the valve seat surface $N^2$ of the member N. The resultant increase in the pressure in the upper chamber $J^{11}$, moves the valve K downward and thereby connects the pipe $I^2$ to the motive fluid supply pipe HC, and connects the pipe $I'$ to exhaust through the ports $J^7$. The piston C then moves in the direction to give a closing adjustment to the damper B. The resultant movement of the rack bar X gives the cam W a turning movement, clockwise, as seen in Fig. 2. That cam movement gives a counterclockwise movement to the rock shaft U as seen in Fig. 2, and through the arm $U'$, lowers the spring abutment T, and increases the compression of the spring S. The down movement of the spring abutment T continues until the increased compression of the spring slightly exceeds the opposing force of the control pressure on the end wall $Q^3$, and contracts or shortens the bellows to the extent required to return the pilot valve mechanism to its normal condition. The resulting equalization of the pressures in the chambers $J^{11}$, permits the springs P to return the valve K to its normally neutral position shown in Fig. 3, in which neither end of the cylinder C is in communication with the pipe HC or is open to exhaust. The motive fluid then trapped in the two ends of the cylinder C, holds the piston C in whatever position it may then be in.

Operations which are the converse of those just described, occur on a decrease in the temperature to which the thermo-couple G is exposed.

Figure 4A:
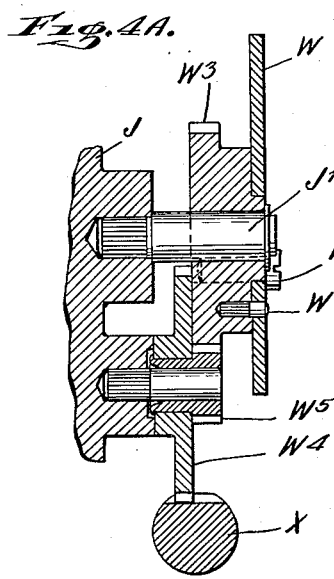
Fig. 4A is a parallel horizontal section taken similarly to Fig. 4, illustrating a modification.

The entire operative effect of the cam W must be produced by an angular movement of the cam of not more than 360°, and it is ordinarily desirable that the cam should be given such an angular movement by a full stroke movement of the piston C'. If, as is practically convenient, the same size cam W is used in regulators in which the piston stroke lengths are different, the gear connections through which a piston movement gives angular movements to the cam, must be different in the different regulators. When the difference in the piston stroke lengths of different regulators is small, it may be accommodated by a change in the pitch diameter of the spur gear $W^3$ to which the cam W is connected, as shown in Figs. 2, 3, and 4. For a regulator in which the piston stroke is considerably greater than in the regulator shown in Figs. 2, 3, and 4, reducing gears may be interposed between the rack bar X and the gear $W^3$ of those figures. Thus, as shown in Fig. 4A, the teeth of the rack bar X is in mesh with a gear $W^4$ secured to a smaller gear $W^5$ which has its teeth in mesh with the gear $W^3$. By the use of additional gears in the reducing gear connection between the rack bar X and the gear $W^3$, the desired full angular movement of the cam W can be effected by a piston stroke of still greater length than that provided for in Fig. 4A.

The arrangement of Figs. 2 and 3 is satisfactory for most purposes but where in manufacturing the device of my invention, production inconsistencies occur such for example as variations in length of the springs SA or rods R, a construction permitting greater flexibility of adjustment is desired. Such a construction is shown in Fig. 3A in which the member $QA^2$ corresponding to the member $Q^2$ of Fig. 3A is secured against rotation by means of a pin $QA^{21}$ secured to the member $QA^2$ and projecting into an aperture $QA^{22}$ in the housing proper. By this means accidental movement of member $QA^2$ as in attaching pipe FC is prevented. The member $QA^3$ of Fig. 3A corresponding to the member $Q^3$ of Fig. 3 is formed with an internal thread adapted to receive a threaded bushing $QA^{30}$ which is provided with an annular bottom portion supporting spring SA. By angular adjustment of bushing $QA^{30}$ with respect to member $QA^3$ whereby the axial relation of those parts is adjusted, the initial compression of spring SA is thus determined.

It is also desirable to guard against unduly stressing bellows Q which might occur if the loading spring SA were removed while a control pressure exists within the bellows. For this purpose the device of Fig. 3A is provided with a stop member QB having a top wall portion QB' arranged to be engaged by bellows Q to prevent abnormal elongation of the latter. The wall portion QB' has a control aperture through which bushing $QA^{30}$ projects which is large enough to avoid interference with the reciprocatory movements of the bushing and associated parts in their normal operating range of travel. Member QB is threaded onto a member $QB^2$ which is clamped between member $QA^2$ and the stationary housing so that by rotating member QB with respect to member $QB^2$ the limit formed by wall portion QB' may be varied longitudinally of the axis of bellows Q.

Figure 5:
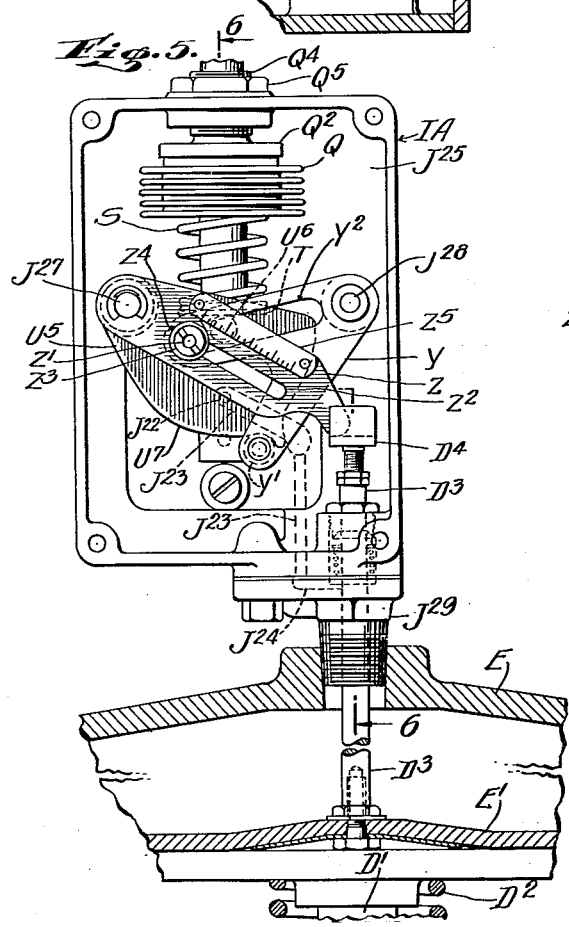
Fig. 5 is an elevation of a portion of the fuel valve regulator shown in Fig. 1, with parts removed.
Figure 6:
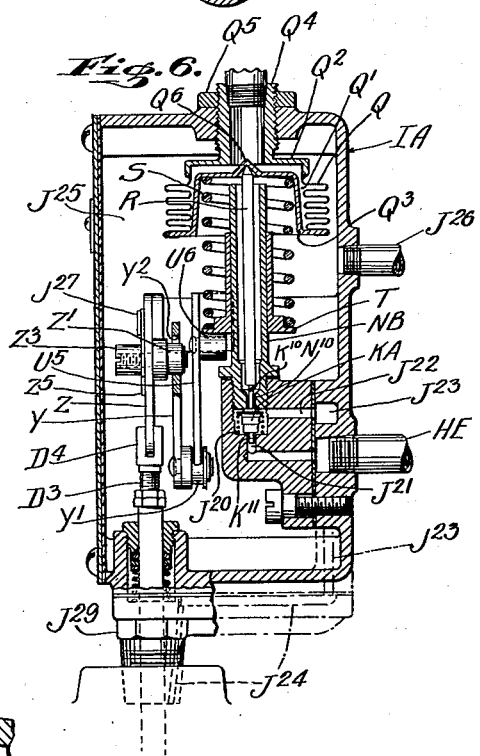
Fig. 6 is a section on the line 6—6 of Fig. 5.

As will be apparent, the stem D' of the movable valve member of the fuel regulator might be connected to a corresponding piston C, mounted and associated with regulator parts exactly like those shown in Figs. 2, 3, and 4. It is advantageous, however, in some cases at least, to employ a regulator, operating generally as does the regulator shown in Figs. 2, 3, and 4, which is formed by adding mechanism parts to an ordinary fluid pressure motor valve, and such a regulator is shown in Figs. 1, 5, and 6. The valve mechanism structure IA of Figs. 1, 5, and 6, comprises a valve chamber $J^{20}$ with coaxial inlet and exhaust ports $J^{21}$ and $N^{10}$, respectively opening to the chamber $J^{20}$ at its opposite ends. A valve member KA working in the chamber $J^{20}$, is movable from a lower position in which it closes the inlet port $J^{21}$ and opens the exhaust port $N^{10}$, into an upper position in which it closes the last mentioned port and opens the inlet port $J^{21}$. The chamber $J^{20}$ communicates at all times with the pressure chamber E of the motor pressure valve mechanism, through a passage including a portion $J^{22}$ leading away from the side of the valve chamber $J^{20}$ and portions $J^{23}$ and $J^{24}$ hereinafter described. The inlet port $J^{21}$ is connected to the motive fluid supply pipe HE. The exhaust port $N^{10}$ is formed in the plug portion of a member NB, generally similar in form to the member NA, and the plug portion of which is threaded into and closes the upper end of the chamber $J^{20}$. The port $N^{10}$ opens into the chamber space $J^{25}$ in the structure IA, which communicates with the atmosphere through a vent opening $J^{26}$. The valve member KA has axial extensions $K^{10}$ and $K^{11}$ at its opposite ends, loosely extending through the ports $N^{10}$ and $J^{21}$, respectively.

The end extension $K^{10}$ of the valve K is acted upon through a thrust rod R by a bellows unit, exactly as is the end extension of the lower pilot valve member M of Figs. 2, 3 and 4. The bellows unit of Figs. 5 and 6 comprises parts Q, Q', $Q^2$, $Q^3$, $Q^4$, $Q^5$, and $Q^6$, and is associated with a spring S and adjustable spring abutment member T, as in the construction shown in Figs. 2, 3, and 4, and 5. The movable abutment member T of Figs. 5 and 6 is slidingly mounted on a sleeve portion of the member NB, corresponding to the sleeve part $N^3$ of the member NA.

The means shown in Figs. 5 and 6 for varying the tension of the spring S in accordance with the movements of the diaphragm E' and valve stem D', comprises a lever element $U^5$. The latter is journalled on a shaft $J^{27}$, and carries a lateral projection $U^6$ engaging the abutment member T, so that the spring S is compressed when the lever $U^5$ is turned counterclockwise, as seen in Fig. 5. The lever $U^5$ is adjusted angularly by angular adjustment of a lever Y pivoted on a stationary shaft $J^{28}$, and carrying a cam roller Y', bearing against the cam edge $U^7$ of the lever $U^5$. The angular position of the lever Y is adjusted by angular adjustment of a third lever Z. The latter is pivoted at one end on the shaft $J^{27}$ and has its opposite end rounded to engage a seat formed for the purpose in the outer end portion $D^4$ of a rod $D^3$. The latter is, in effect, an upper extension of the valve stem D'.

The lever Z acts on the lever Y through a lateral projection from the lever Z, which, as shown, is formed by the head of a screw Z', which is slidingly received in a slot $Y^2$ formed in the lever Y and extending radially away from the shaft $J^{28}$. The body of the screw Z' extends through a slot $Z^2$ in the lever Z extending in a direction generally radial to the shaft $J^{27}$. The screw Z' may be clamped to the member Z at any point along the length of the slot $Z^2$, by adjustment of the clamping nut $Z^3$ threaded on said screw. As will be apparent, the leverage with which the stem extension $D^3$ acts on the lever $U^5$, and thereby on the spring abutment member T is increased and decreased as the screw $Z'$ is adjusted along the slot $Z^2$ respectively toward and away from the shaft $J^{27}$. The change in the compression of the spring S necessary to balance the control pressure action on the bellows end wall, as the control pressure varies between its minimum and maximum values, will thus be effected by a movement of the diaphragm and valve stem $D'$ which is relatively large or relatively small, accordingly as the screw $Z'$ is near the left or right hand end, respectively, of the slot $Z^2$, as seen in Fig. 6. Interposed between the said clamping nut and the lever Z is a washer $Z^4$, carrying an index mark cooperating with the scale on a scale part $Z^5$, carried by the lever Z, to indicate the position along the length of the slot $Z^2$ at which the screw $Z^2$ is secured, and thereby to indicate the permissible range of axial movement of the valve stem $D'$.

As shown, the valve mechanism housing structure IA is provided with a detachable nipple extension $J^{29}$, which is screwed into a threaded aperture in the top wall of the valve mechanism chamber E. The rod $D^3$ extends through, and is movable in, the bore of the nipple $J^{29}$. The previously mentioned portions $J^{23}$ and $J^{24}$, of the passage through which the valve chamber $J^{20}$ is connected to the chamber $E'$ are formed in the wall of the housing structure IA, and in the nipple part $J^{29}$, respectively.

While I have found it convenient in the foregoing description to treat and refer to the valve mechanisms as vertically disposed as they appear in Figs. 2, 3, 5 and 6, it is to be understood, however, when the motive fluid is compressed air, and not a liquid under pressure neither the valve mechanisms nor the pressure motors illustrated, have any significant gravitational bias or action, and each of said motors and valve mechanisms will operate in any position.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a regulator including a fluid pressure motor element adjustable to different positions by different motive fluid actions thereon, a valve mechanism adjustable to subject said element to said different sections and comprising a supporting structure enclosing a valve chamber having an exhaust port at one end, a valve member axially movable in said chamber, a bellows, a spring, and a spring abutment mounted in said structure and each coaxial with said chamber and valve, said bellows having a movable end wall, an operative connection between said end wall and valve member including a portion extending loosely through said port, means for subjecting said end wall to a variable controlling pressure tending to move it in one direction, said spring acting between said abutment member and end wall in a direction tending to move the latter in the opposite direction, and a mechanical connection between said element and abutment member through which the latter is given movements axial of said chamber proportional to the movements of said element.

2. In a regulator including a fluid pressure motor element adjustable to different positions by different motive fluid actions thereon, a valve mechanism adjustable to subject said element to said different actions and comprising a supporting structure enclosing a valve chamber having an exhaust port at one end, a valve member axially movable in said chamber, a bellows, a spring, and a spring abutment mounted in said structure and each coaxial with said chamber and valve, said bellows having a movable end wall, an operative connection between said end wall and valve member including a portion extending loosely through said port, means for subjecting said end wall to a variable controlling pressure tending to move it in one direction, said spring acting between said abutment member and end wall in a direction tending to move the latter in the opposite direction, and a mechanical connection between said element and abutment member including a rotatable cam journalled in said structure and engaging said abutment member through which the latter is given movements axial of said chamber proportional to the movements of said element.

3. In a regulator including a fluid pressure motor element adjustable to different positions by different motive fluid actions thereon, a valve mechanism adjustable to subject said element to said different actions and comprising a supporting structure enclosing a valve chamber, a valve member axially movable in said chamber, a bellows, a spring, and a spring abutment mounted in said structure and coaxial with said chamber and valve, said bellows having a movable end wall, an operative connection between said end wall and valve member, means for subjecting said end wall to a variable controlling pressure tending to move it in one direction, said spring acting between said abutment member and end wall in a direction tending to move the latter in the opposite direction, and a connection between said element and abutment member through which the latter is given movements axial of said chamber proportional to the movements of said element, said connection comprising a spur gear mounted in said structure, a rotatable cam engaging said abutment member and rotated by the rotation of said gear, and a rack bar having its teeth in mesh with said gear and connected to, said element and given longitudinal movements by the adjustments thereof.

4. In a regulator including a fluid pressure motor element adjustable to different positions by different motive fluid actions thereon, a valve mechanism adjustable to subject said element to said different actions comprising a supporting structure enclosing a valve chamber, a valve member axially movable in said chamber, a bellows, a spring, and a spring abutment mounted in said structure said bellows having a movable end wall, an operative connection between said end wall and valve member, means for subjecting said end wall to a variable controlling pressure tending to move it in one direction, said spring acting between said abutment member and end wall in a direction tending to move the latter in the opposite direction, and a connection between said element and abutment member through which the latter is given movements axial of said chamber proportional to the movements of said element, said connection comprising a cam lever engaging said abutment member and angularly adjustable about an axis and having a cam edge with different portions thereof at different distances from said axis, a second lever engaging said cam lever and angularly adjustable about an axis laterally displaced from the first mentioned axis and having an engaging portion engaging said cam edge, and moving along the latter, and angularly adjusting said cam lever, when said second lever is angularly adjusted and means through which the adjustment of said element angularly adjusts the last mentioned lever.

5. In a regulator including a fluid pressure motor element adjustable to different positions by different motive fluid actions thereon, a valve mechanism adjustable to subject said element to said different actions, comprising a supporting structure enclosing a valve chamber, a valve member axially movable in said chamber, a bellows, a spring, and a spring abutment mounted in said structure, said bellows having a movable end wall, an operative connection between said end wall and valve chamber, means for subjecting said end wall to a variable controlling pressure tending to move it in one direction, said spring acting between said abutment member and end wall in a direction tending to move the latter in the opposite direction, a cam lever, engaging said abutment member and having a cam edge and being angularly adjustable about an axis and on such adjustment, adjusting said abutment member and thereby varying the tension of said spring, a lever angularly adjustable about an axis laterally displaced from the first mentioned axis and engaging the cam edge of said cam lever, a third lever turned about the first mentioned axis by adjustments of said element, and a connection between said third and second mentioned levers adjustable to vary the leverage with which said element acts through the two levers last mentioned on said cam lever.

6. In a regulator including a fluid pressure motor element adjustable to different positions by different motive fluid actions thereon, a valve mechanism adjustable to subject the said element to said different actions, and comprising a supporting and enclosing structure enclosing and supporting a valve chamber, a valve member axially adjustable in said chamber, a bellows element coaxial with said chamber, and having at one end an end member with a nipple extension adjustably threaded into said structure, and having at its opposite end a movable end wall, an operative connection between said valve member and movable end wall, conduit means external to said enclosing structure connected to said nipple for transmitting a variable control pressure to said bellows, a spring abutment, guiding means along which said abutment is movable in the axial direction of said chamber, a spring acting between said abutment and movable end wall, and opposing the tendency of the latter to move in one direction under the action of the control pressure, and a mechanical connection between said element and abutment for varying the tension of said spring as said element is adjusted to different positions.

7. In a regulator comprising a fluid pressure motor cylinder and a piston working in said cylinder, a valve mechanism comprising a valve chamber circular in cross section formed with a vent port at each end and formed intermediate its ends with lateral ports including a motive fluid inlet port, ports separately communicating with the two ends of said cylinder and exhaust ports, a piston valve controlling said lateral ports axially movable in said chamber in response to changes in the pressures in the ends of said chamber between one end position in which said cylinder has one end connected to a source of motive fluid under pressure, has its other end connected to exhaust, and a second end position in which the last mentioned cylinder end is connected to said source and the first mentioned cylinder end is connected to exhaust, and means including pilot valve means controlling said vent ports, for varying the pressures in the ends of said chamber, said pilot valve means extending through said chamber and vent ports, said pilot valve means, piston valve and valve chamber being coaxial.

8. In a regulator comprising a fluid pressure motor cylinder and a piston working in said cylinder, a valve mechanism comprising a valve chamber circular in cross section formed with a vent port at each end and formed intermediate its ends with lateral ports including a motive fluid inlet port, ports separately communicating with the two ends of said cylinder and exhaust ports, a piston valve controlling said lateral ports and axially movable in said chamber between one end position in which said cylinder has one end connected to said inlet port and has its other end connected to an exhaust port, and a second end position, in which the last mentioned cylinder end is connected to said inlet port and the first mentioned cylinder end is connected to an exhaust port, and pilot valve means extending through said chamber and vent ports movable axially of said chamber in one direction or the other from an intermediate position to close one or the other of said vent ports, both of which are open, when said pilot valve mechanism is in its intermediate position, said mechanism being arranged to permit a small continuous leakage flow of motive fluid from said inlet port to each end of said chamber, said pilot valve means, piston valve and valve chamber being coaxial.

9. In a regulator comprising a fluid pressure motor cylinder and a piston working in said cylinder, a valve mechanism comprising a valve chamber circular in cross section formed with a vent port at each end and formed intermediate its ends with lateral ports including a motive fluid inlet port, ports separately communicating with the two ends of said cylinder and exhaust ports, a piston valve controlling said lateral ports and axially movable in said chamber between one end position in which said cylinder has one end connected to said inlet port and has its other end connected to an exhaust port, and a second end position, in which the last mentioned cylinder end is connected to said inlet port and the first mentioned cylinder end is connected to an exhaust port, and pilot valve means movable axially of said chamber in one direction or the other from an intermediate position to close one or the other of said vent ports, both of which are open, when said pilot valve mechanism is in its intermediate position, said mechanism being arranged to permit a small continuous leakage flow of motive fluid from said inlet port to each end of said chamber, and said piston valve being biased for movement into an intermediate position in which it is maintained when both vent ports are open.

10. In a regulator comprising a fluid pressure motor cylinder and a piston working in said cylinder, a valve mechanism comprising a valve chamber formed with a vent port at each end and formed intermediate its ends with lateral ports including a motive fluid inlet port, ports separately communicating with the two ends of said cylinder and exhaust ports, a hollow piston valve controlling said lateral ports and axially movable in said chamber between one end position in which said cylinder has one end connected to said inlet port and has its other end connected to an exhaust port, and a second end position in which the last mentioned cylinder end is connected to said inlet port and the first mentioned cylinder end is connected to an exhaust port, pilot valve means extending through piston valve, movable axially of said chamber in one direction or the other from an intermediate position to close one or the other of said vent ports, both of which are open when said pilot valve mechanism is in its intermediate position, said mechanism being arranged to permit a small continuous leakage flow of motive fluid from said inlet port to each end of said chamber, and said piston valve being biased for movement into an intermediate position in which it is maintained when both vent ports are open, and regulator controlling means for axially adjusting said pilot valve means.

11. A regulator as specified in claim 7, in which the pilot means controlling the vent ports includes a separate pilot valve member for each vent port comprising a body portion within the valve chamber and a pin-like portion extending loosely through the vent port, and includes a thrust rod, which is separate from, but has its opposite ends in engagement with the two valve members, and includes a bias spring tending to move one of said valve members in the opening direction and the other in the closing direction, and in which the piston valve is formed with a passage through which said thrust loosely extends, whereby said valve members may be adjusted by a varying pressure applied to the pin portion of said other valve.

COLEMAN B. MOORE.